UNITED STATES PATENT OFFICE.

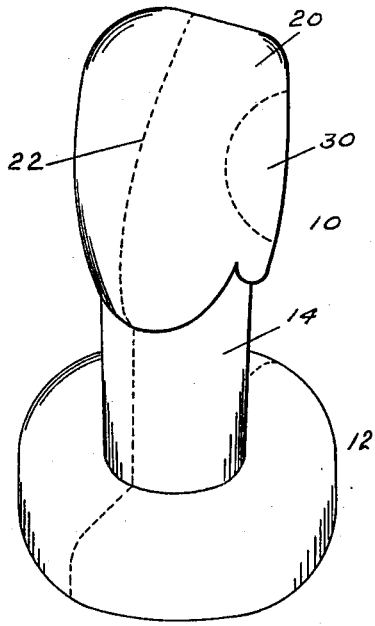
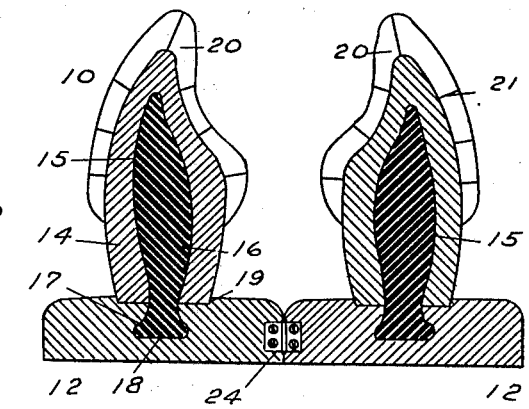
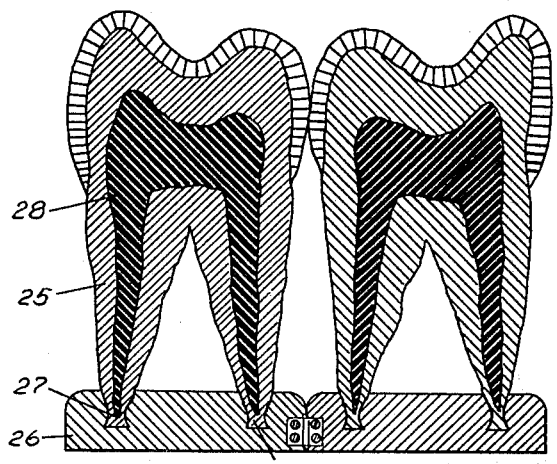

CHARLES C. ALLEN, OF KANSAS CITY, MISSOURI.

ANATOMICAL MODEL.

1,048,382.

Specification of Letters Patent. Patented Dec. 24, 1912.

Application filed April 1, 1912. Serial No. 687,821.

*To all whom it may concern:*

Be it known that I, CHARLES C. ALLEN, a citizen of the United States of America, residing at Kansas City, in the county of Jackson and State of Missouri, have invented certain new and useful Improvements in Anatomical Models; and I do hereby declare that the following is a full, clear, and exact description of the invention, such as will enable others to make and use the same, reference being had to the accompanying drawing, forming a part of this specification.

The invention has for its object, primarily, an educational appliance such as an artificial tooth, representing the natural tissues, and approximately in their proper proportions for demonstrative purposes. Secondly, to demonstrate the internal, as well as the external structure upon an enlarged and properly proportioned scale. Third, a demonstrative illustration in anatomical models, of the proportional depth or thickness of tissues and enveloping substances, such as enamel.

The invention consists in the novel construction and combination of parts, such as will be fully described and then pointed out specifically in the claims.

In the drawings: Figure 1. is a view in perspective of the anatomical model, shown on a large scale and mounted upon a base. Fig. 2. is a view, in elevation, of the separable parts of the model upon a smaller scale, showing the internal, structural reproductions of a tooth and flexible connection of model and base. Fig. 3. is a view of the separable parts of a model or specimen of another form of organism shown in separate parts to display the internal structure.

Similar numerals of reference indicate corresponding parts in all the figures of the drawing.

Referring to the drawings, 10 indicates a model of a tooth, and particularly an exact reproduction upon an enlarged scale of a central incisor as found in the jaw of an adult person, the lower root portion being cut away transversely and mounted on a base 12.

The model or tooth 10 is made of friable material, such as plaster of Paris, and with the addition of coloring substances that will produce in the plaster of Paris a color analogous to that of the natural tooth. The interior of the model or tooth 10 is hollow, or made with a cavity 15, which corresponds to the cavity for the pulp or nerve fiber 16, in an ordinary tooth, and which extends downwardly through the lower portion of the artificial tooth. The pulp 16 is made from elastic material, such as gutta percha, or may be made from wax or like substances, and the material or substances impregnated while in a solvent condition with a coloring substance, such as anilin dye or other coloring matter, which will produce in the gutta percha or like substance a suitable imitation of the pulp or a near resemblance thereto, and also to the nerve fiber of a tooth. The cavity 15 is filled with the gutta percha in a solvent condition, and a portion 17 extended outwardly from the lower portion of the artificial tooth 10, and the parts expanded to form a foot, of dovetail formation. In the central portion of the base 12, is made a depression 18, of dovetail formation, in which is inserted the dovetail extension 17, of the elastic substance 16, which forms a yielding ligament between the artificial tooth 10 and the base 12. When the base is made from plaster of Paris, the material is molded around the extension 17. In the upper portion of the base 12 is a depression 19, of slight depth, which receives the lower portion of the tooth 10.

20 indicates an exterior coating on the tooth 10 of the model. The coating consists of a pure white substance, such as lime and plaster mixed in the proper proportions, and applied to the outer surface of the body 14, in such a manner as to conform to and accurately represent the outer covering of surfaces of the crown of a tooth, known as the enamel. In laying the plastic lime and plaster upon the artificial tooth 10, pins or rods 21 are inserted in the soft plaster substance resembling the enamel, the pins being of different length, and thus indicating the thickness necessary in which the plastic substance is to be applied on the outer portion of the artificial tooth 10, to indicate the relative thickness of the enamel upon a tooth. The coating or covering 20 is continued as shown on the model part way down on the artificial tooth 10. Upon the hardening of the external coat or covering 20, resembling the enamel, the pins are retained therein and form a reinforcement to the material. Upon completion, the model and base are separated into two equal parts, as shown, the line of separation being made upon the dotted lines seen in Fig. 1 and the separated parts of the base hinged together by the leaf hinge 24.

Fig. 3 represents a double tooth or bicuspid, embodying the invention.

In the demonstrative work of object teaching the complete model of a tooth as seen in Fig. 1 is given to a pupil in lieu of printed illustrations, and with the aid of a scalpel cavities are made in the enamel and in resemblance to the cavities formed in a decayed tooth, as indicated upon 30, in Fig. 1, the depth of the cavity being carefully diagnosed, to determine the steps necessary for artificial restoration. In this manner the model serves as a subject for experimental treatment, and becomes of value and of importance, owing to the fact that extracted teeth are difficult to obtain for clinical purposes, and would not be equal to demand in colleges and schools. These models have another purpose, i. e., to be used for demonstration in the study of the structure of teeth external and internal, and in the latter detail the model may be separated into parts upon other lines best adapted to display the structure.

I am aware that an artificial tooth has been employed for educational purposes wholly composed of india rubber which is capable of being cut by a dental tool. These models however give no indication to the student of the exposure of the nerve fiber, in the depth of cut, nor the relative location of the nerve fiber within the body of the tooth. Neither is there any possibility of a demonstration of the method of capping the nerve fiber in the artificial tooth composed wholly of india rubber or other material.

I have shown the invention as applied to a model of a tooth, but specimens may be prepared in the same manner of other forms of organisms with appropriate reference to the structural parts. When mounted, as shown, the models are convenient for inspection, especially in schools and museums, the connection of the model and base preventing the constant breaking of expensive models, which are frequently subject to constant usage and not over-cautious handling.

The re-mounting of models is also more readily made, in case of destruction of the models, while the application of the invention may be made to various specimens artificially made for demonstrating the human form with such modifications as are within the scope of the appended claims.

Having fully described my invention, what I now claim as new and desire to secure by Letters Patent is:

1. In educational appliances an artificial tooth having a cavity and a pulp in said cavity, the body of the tooth being composed of friable material which is adapted to be cut by a dental tool and the pulp composed of a relatively soft material.

2. In educational appliances an artificial tooth composed of friable material analogous to the bone structure of the natural tooth and which may be cut by a dental tool, said friable material having a cavity in the interior thereof analogous to the cavity for the nerve fiber of the natural tooth and a pulp in said cavity composed of a relatively soft elastic material.

3. In educational appliances an artificial tooth having a cavity, the body of the tooth being composed of friable material analogous to the bone structure of the natural tooth, which is adapted to be cut by a dental tool and a pulp in the cavity composed of elastic material, said tooth being divisible for demonstrative purposes.

4. In an anatomical model, a body in reproduction of an organism having a cavity or cavities containing an elastic pulp, and an extension of the pulp of dovetail formation, and a base having a depression of dovetail formation adapted to receive the dovetail extension of the pulp.

5. An anatomical model composed of plaster of Paris molded in the form of a tooth and a base elastically united therewith said tooth and said base being in separate parts, the parts of said base being hinged together.

CHARLES C. ALLEN.

Witnesses:
WILLIAM H. RENNER,
ANNIE L. GREER.

Copies of this patent may be obtained for five cents each, by addressing the "Commissioner of Patents, Washington, D. C."